US009168750B2

(12) United States Patent
Sasaki et al.

(10) Patent No.: US 9,168,750 B2
(45) Date of Patent: Oct. 27, 2015

(54) MANUFACTURING METHOD OF LIQUID DISCHARGING HEAD

(71) Applicant: CANON KABUSHIKI KAISHA, Tokyo (JP)

(72) Inventors: Koji Sasaki, Nagareyama (JP); Shuji Koyama, Kawasaki (JP); Keiji Matsumoto, Kawasaki (JP); Seiichiro Yaginuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/089,629

(22) Filed: Nov. 25, 2013

(65) Prior Publication Data

US 2014/0151336 A1 Jun. 5, 2014

(30) Foreign Application Priority Data

Nov. 30, 2012 (JP) ................................. 2012-263260

(51) Int. Cl.
*C03C 15/00* (2006.01)
*B41J 2/16* (2006.01)

(52) U.S. Cl.
CPC .............. *B41J 2/1634* (2013.01); *B41J 2/1603* (2013.01); *B41J 2/1629* (2013.01); *B41J 2/1631* (2013.01); *B41J 2/1639* (2013.01); *B41J 2/1645* (2013.01)

(58) Field of Classification Search
CPC .................................. B23K 26/00; B41J 2/05
USPC ......... 216/94; 430/311, 320, 322; 347/63, 65, 347/85
See application file for complete search history.

(56) References Cited

U.S. PATENT DOCUMENTS

| | | | | |
|---|---|---|---|---|
| 8,017,307 | B2 * | 9/2011 | Kubota et al. | 430/320 |
| 2008/0317971 | A1 * | 12/2008 | Toshishige et al. | 427/553 |
| 2009/0065472 | A1 * | 3/2009 | Asai et al. | 216/27 |

FOREIGN PATENT DOCUMENTS

JP 05-330046 A 12/1993

* cited by examiner

*Primary Examiner* — Duy Deo
*Assistant Examiner* — Maki Angadi
(74) *Attorney, Agent, or Firm* — Canon USA Inc. IP Division

(57) ABSTRACT

A manufacturing method of a liquid discharging head includes: preparing a substrate having an energy-generating element and a resin layer on a first face side; irradiating a laser beam on the substrate so as to pass through the resin layer to form a hole serving as a liquid supply port in the substrate; removing a portion of the resin layer including a region which the laser beam has passed through, thereby forming a portion from which the resin layer has been removed as a channel, and forming a portion in which the resin layer remains as a side wall; and forming a discharge port forming member on a far side from the substrate of the side wall, and to form the channel forming member using the side wall and the discharge port forming member.

10 Claims, 4 Drawing Sheets

MANUFACTURING METHOD OF LIQUID DISCHARGING HEAD

BACKGROUND OF THE INVENTION

1. Field of the Invention

The present invention relates to a manufacturing method of a liquid discharging head.

2. Description of the Related Art

A liquid discharging head to be used for an ink jet recording apparatus or the like is formed of a substrate, and a channel forming member formed on the substrate. A liquid supply port configured to supply liquid is formed in the substrate, and a channel and a discharge port are formed in the channel forming member. Liquid is supplied from the liquid supply port to the channel, provided with energy by an energy-generating element, and discharged from the liquid discharge port.

As a method for forming a liquid supply port in a substrate, there is a method for forming a hole serving as a liquid supply port by irradiating a laser beam on a substrate. In the event that a liquid supply port has been formed by such a technique, fragments of the substrate have been scattered around the hole in some cases. Such fragments are called debris. In particular, with a liquid discharging head, debris adhering to the substrate or a discharge port forming member may influence manufacturing processes after laser irradiation, or liquid discharge performance. There is accordingly demand to suppress debris from adhering to the substrate and channel forming member.

On the other hand, Japanese Patent Laid-Open No. 5-330046 discloses a technique wherein a resin protective film is formed on the surface of a substrate, debris generated by laser irradiation is received at the protective film, and thereafter, adhesion of debris to the substrate or channel forming member is suppressed by removing the protective film.

SUMMARY OF THE INVENTION

An embodiment of the present invention is a manufacturing method of a liquid discharging head including a substrate, in which a liquid supply port is formed, having an energy-generating element on a first face side, and a channel forming member configured to form a channel and a discharge port, the method including: preparing the substrate having the energy-generating element and a resin layer on the first face side; irradiating a laser beam on the substrate so as to pass through the resin layer to form a hole serving as the liquid supply port in the substrate; removing a portion of the resin layer including a region which the laser beam has passed through, thereby forming a portion from which the resin layer has been removed as a channel, and forming a portion in which the resin layer remains as a side wall; and forming a discharge port forming member on a far side from the substrate of the side wall, and to form the channel forming member using the side wall and the discharge port forming member.

Further features of the present invention will become apparent from the following description of exemplary embodiments with reference to the attached drawings.

DESCRIPTION OF THE EMBODIMENTS

The method disclosed in Japanese Patent Laid-Open No. 5-330046 requires a process to coat a protective film before laser irradiation. Also, a process to remove the protective film after laser irradiation is needed. Accordingly, processes to manufacture a liquid discharging head increase, and it is difficult to simplify the processing process.

Accordingly, the present invention provides a simple process to suppress debris from adhering to a substrate or channel forming member, even in a case where a liquid supply port is formed by irradiating a laser beam on the substrate.

Figure 2:
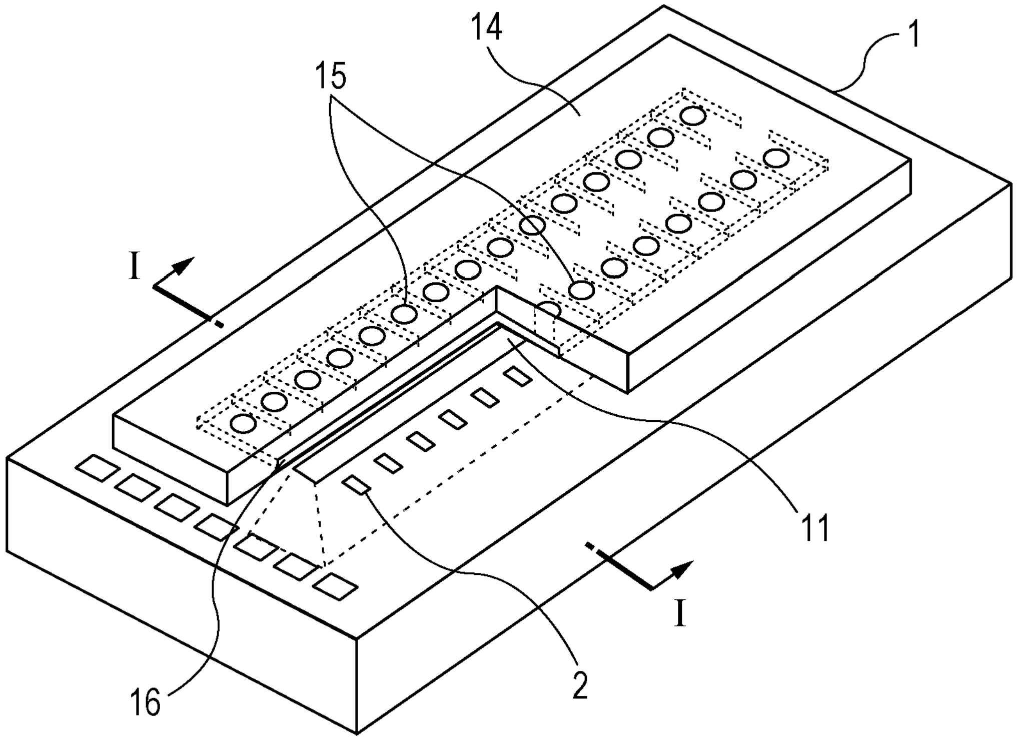
FIG. 2 is a diagram illustrating an example of a liquid discharging head manufactured according to an embodiment of the present invention.

FIG. 2 illustrates an example of a liquid discharging head manufactured by an embodiment of the present invention. Energy-generating elements 2 configured to generate energy for discharging liquid are disposed on a substrate 1. The energy-generating elements 2 do not have to be in contact with the substrate 1, and may float in midair. The energy-generating elements 2 are electrically connected to a control signal input electrode configured to drive the energy-generating elements 2. Also, liquid discharge ports 15 and a channel 16 which are opened above the energy-generating element 2 are formed on the substrate 1 by a channel forming member 14.

A liquid supply port 11 is formed in the substrate 1, liquid supplied from the liquid supply port 11 to the channel 16 is given energy by the energy-generating elements 2, and is discharged from the liquid discharge ports 15.

A liquid discharging head manufacturing method according an embodiment of the present invention will be described with reference to FIGS. 1A to 1H. FIGS. 1A to 1H are cross-sectional views along I-I in FIG. 2.

Figure 1A:
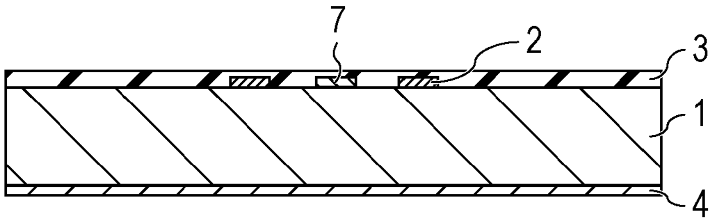
FIGS. 1A to 1H are diagrams illustrating a liquid discharging head manufacturing method according to an embodiment of the present invention.

First, the substrate 1 is prepared as illustrated in FIG. 1A. The energy-generating elements 2 are formed on a first face side of the substrate 1. The substrate 1 is formed of silicon or the like. In particular, in a case where the substrate 1 is formed of silicon, a silicon substrate of which the crystal orientation of the first face is (100) is preferably employed. The energy-generating elements 2 may be elements configured to generate energy according to heat such as TaSiN or the like, or may be piezoelectric transducers. The energy-generating elements 2 are covered with an insulation layer 3. The insulation layer 3 is formed of SiN or SiC or the like, for example. A sacrificial layer 7 is provided at a position between two energy-generating elements. The sacrificial layers 7 are to control opening width of the liquid supply port formed in the substrate, and in FIG. 1A serve to control opening width on the first face side of the liquid supply port. The sacrificial layers 7 are formed of a material which is readily subjected to etching as compared to the substrate. For example, in the event that the substrate is formed of silicon, the sacrificial layers 7 are preferably formed of aluminum or aluminum compound (a compound of aluminum and silicon, or aluminum copper). If we say that the first face side of the substrate 1 is the surface side, a protective layer 4 is provided to the second face side of the substrate which is a rear face side thereof. Examples of the protective layer 4 include $SiO_2$, and polyether amide.

Figure 1B:
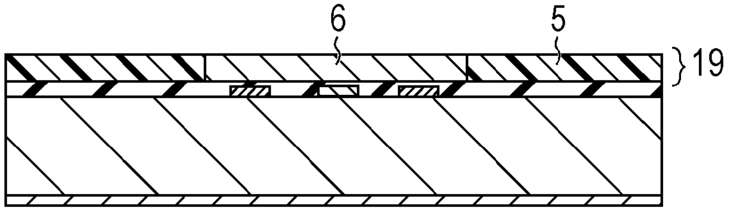

Next, as illustrated in FIG. 1B, a resin layer 19 made up of a resin is formed on the first face side of the substrate. A dry film is employed as the resin layer 19, for example. A photosensitive resin is employed as the resin of the resin layer 19, for example. The resin layer is divided into a side wall 5 of a channel of the channel forming member, and a channel portion 6 serving as a channel. In the event that a negative photosensitive resin is employed as the photosensitive resin, a part of the resin layer 19 is exposed, and a remaining portion is prevented from being exposed using a mask. At this time, the exposed region becomes the side wall 5, and the unexposed region becomes the channel portion 6. In the event that a positive photosensitive resin is employed as the resin layer 19, the unexposed region becomes the side wall 5, and the exposed region becomes the channel portion 6. It is desirable from a viewpoint such as resistance to ink or the like that in the case of the photosensitive resin, the side wall of the channel is formed of a negative photosensitive resin. Accordingly, the resin layer 19 is preferably formed of a negative photosensitive resin. Examples of the negative photosensitive resin include a photocationic-curable resin. Specifically, an epoxy resin or polyimide resin is employed, to which a photocationic polymerization initiator is added, may be employed as the resin layer 19. Even in the event that the resin layer 19 is formed of a non-photosensitive resin, a portion finally serving as the side wall of the channel is the side wall 5, and a portion serving as a part of the channel is the channel potion 6. At the point-in-time illustrated in FIG. 1B, the resin layer 19 does not necessarily have to be divided into the side wall 5 and channel portion 6.

Figure 1C:
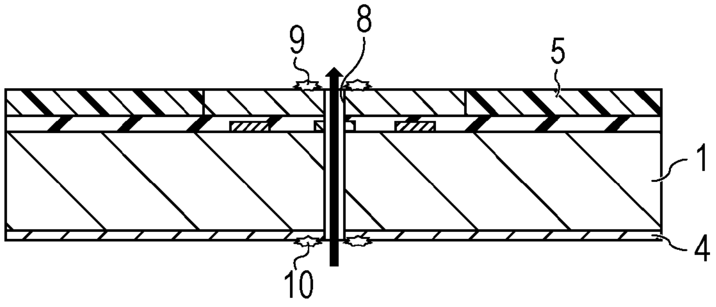

Next, as illustrated in FIG. 1C, a laser beam is irradiated on the substrate 1, and the resin layer 19 is penetrated by the laser beam. The laser beam penetrates the substrate 1 to form a hole 8 in the substrate 1. In the process in FIG. 1B, for example, in the event that exposure has already been performed on the resin layer 19, and has been divided into the side wall 5 and channel portion 6, a laser beam is irradiated on the resin layer 19 so as to strike the channel portion 6 of the resin layer 19 to penetrate the channel portion 6. In the process in FIG. 1B, for example, in the event that exposure has not been performed, and at this point-in-time the side wall 5 and channel portion 6 have not been divided, a laser beam is irradiated so as to strike a region serving as the channel portion 6 in a later-described process to penetrate this region.

A laser beam is preferably irradiated from the second face side of the substrate 1. In the event that the protective layer 4 has been provided to the second face side of the substrate 1, an arrangement may be made wherein an opening is formed in the protective layer 4, and a laser beam is irradiated on the opening, or the protective layer 4 may be penetrated by a laser beam. Also, in the event that the sacrificial layer 7 is provided to the first face side, the laser beam is preferably irradiated so as to penetrate the sacrificial layer 7. Further, with regard to the width direction of the substrate 1 (horizontal direction in FIGS. 1A to 1H), the center of the sacrificial layer 7 preferably agrees with the center of the channel portion 6. Thus, the shape of the liquid supply port can further be stabilized. A pattern to be formed by the laser beam may be, as viewed from the second face side, a linear pattern linked by continuous processing, or may be a pattern made up of points (dots).

FIG. 1C illustrates the way in which a laser beam is irradiated from the second face side of the substrate 1, the laser beam penetrates the channel portion 6 of the resin layer 19, and debris 9 occurs on the channel portion 6. Also, debris 10 different from the debris 9 on the first face side occurs on the protective layer 4 on the second face side of the substrate 1.

Figure 3A:
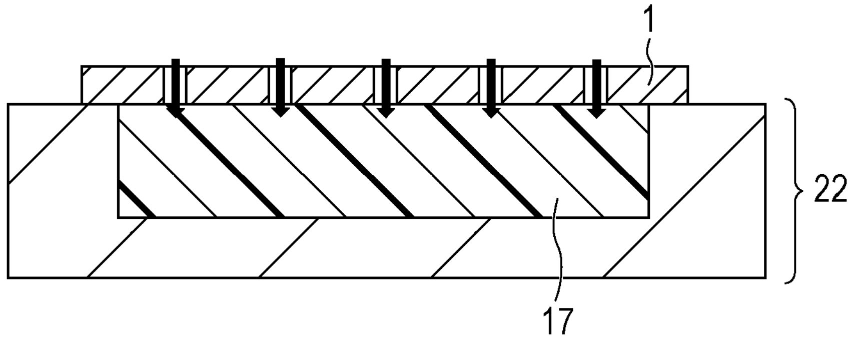
FIGS. 3A and 3B are diagrams illustrating a liquid discharging head manufacturing method according to an embodiment of the present invention.
Figure 3B:
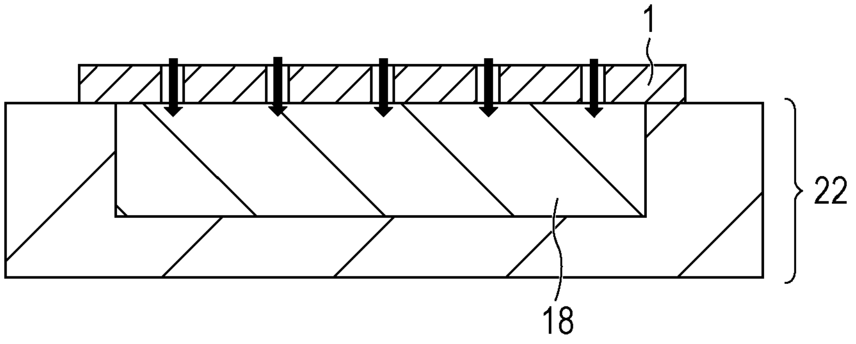

At the time of irradiating a laser beam, the substrate 1 is held at a stage. The stage preferably has a configuration to suppress the laser beam which has penetrated the substrate 1 or resin layer 19 from being reflected and irradiated on the substrate 1 or resin layer 19 again. FIGS. 3A and 3B illustrate a configuration of a stage 22. The resin layer 19 is omitted here. In FIG. 3A, the stage 22 includes a reflex inhibition region 17. The reflex inhibition region 17 preferably has laser reflectivity of 50% or less. As a constituent material of the reflex inhibition region 17, an inorganic substance, inorganic compound, resin, or the like of which the reflectivity is 50% or less is employed, for example. Examples of the inorganic substance include silicon. Examples of the resin include a resin to which an ultraviolet absorbing agent such as acrylonitrile derivative or the like has been added. The laser beam penetrating the resin layer 19 reaches the reflex inhibition region 17, but is not readily reflected at the resin layer 19 on the substrate side 1. In FIG. 3B, a hollow portion 18 is formed in the stage 22. There is no stage in the hollow portion 18. According to such a configuration, the laser beam is suppressed from being reflected at the stage 22 and being irradiated on the substrate 1 and resin layer 19 again.

Figure 1D:
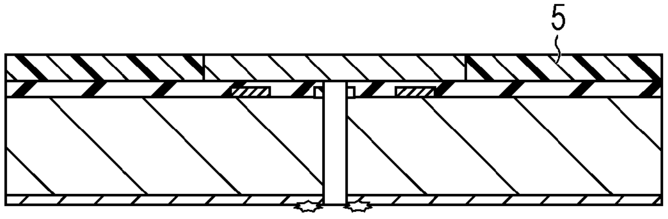

Next, as illustrated in FIG. 1D, a portion including a region which the laser beam has penetrated is removed of the resin layer 19. The portion where the resin layer 19 has been removed becomes a channel. The portion where the resin layer 19 remains becomes a side wall. For example, in the event that light has been irradiated on the resin layer 19 formed of a negative photosensitive resin to form the side wall 5, a portion where no light has been irradiated is the channel portion 6. This channel portion 6 is removed by a solvent or the like. In the event that at the point-in-time in FIG. 1B, exposure has not been performed and the side wall 5 and channel portion 6 not divided, the side wall 5 and channel portion 6 can to be divided by performing exposure in FIG. 1D. According to removal of the channel portion 6, the side wall 5 of the resin layer 19 becomes a portion of a channel forming member internally forming a channel (space formed by the channel portion 6 being removed). Simultaneously with this, the debris 9 on the channel portion 6 is also removed. Accordingly, the debris 9 can be removed from the substrate 1.

Figure 1E:
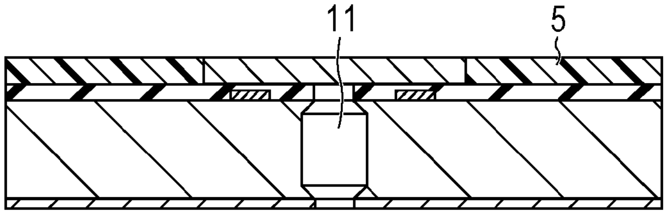

Next, as illustrated in FIG. 1E, etchant is supplied to the hole 8 formed by the laser beam to subject the substrate 1 to etching, thereby forming a liquid supply port 11. Tetramethylammonium hydroxide (TMAH) of 8 percent by mass to 25 percent by mass is preferably employed as the etchant. Silicon of 8 percent by mass or less is preferably included in the etchant. Also, temperature of the etchant is preferably 70 to 85 degrees Centigrade. An etching protective member as to the etchant is preferably formed on the first face side of the substrate 1. Examples of the etching protective member include cyclized rubber. In the event that an etching protective member has been formed on the first face side of the substrate 1, etching is not advanced from the first face side. On the other hand, etching is advanced toward the first face side from a portion where the protective layer 4 on the second face side does not exist. In the event that the sacrificial layer 7 made up of aluminum or the like has been formed, the sacrificial layer 7 is immediately removed by the etchant. The etching protective member is removed after etching of the substrate 1 is completed.

Note that etching by etchant is not necessarily required, and the liquid supply port may be formed by laser irradiation. However, the shape of the liquid supply port is stabilized by employing etchant. Also, in the event that debris 10 has occurred on the second face side, at the time of etching by etchant, the debris 10 on the second face side can also be removed from the substrate 1.

Figure 1F:
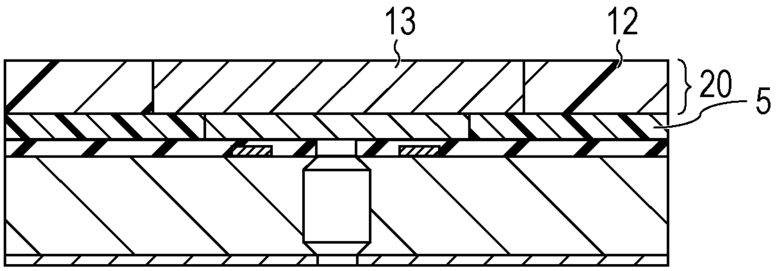

Next, as illustrated in FIG. 1F, another resin layer (second resin layer 20) different from the resin layer 19 (first resin layer 19) is formed on the side wall of the resin layer 19. The second resin layer 20 is preferably formed of a negative photosensitive resin, and particularly preferably formed of a dry film. The second resin layer 20 is, in the same way as with the resin layer 19, partially exposed, and is divided into the side wall 12 and channel portion 13. Note that, in the event that the side wall of the channel forming member is formed of only the side wall 5 of the resin layer 19, formation of the second resin layer 20 is not needed.

Figure 1G:
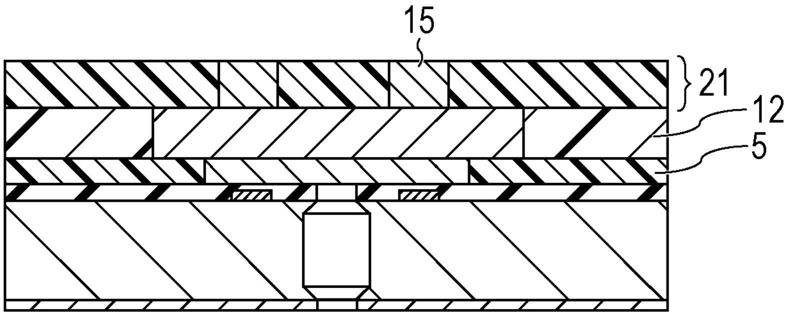

Next, as illustrated in FIG. 1G, a discharge port forming member 21 is formed on a far side from the substrate of the side wall (side wall 5 or side wall 12). The discharge port forming member 21 is disposed on the upper side of the side wall. The discharge port forming member 21 and the side wall makes up a channel forming member. The discharge port forming member 21 is preferably formed of a negative photosensitive resin, and particularly preferably formed of a dry film. The upper face, that is, orifice face of the discharge port forming member 21 may be coated with a water-repellent material. A liquid discharge port 15 is formed in the discharge port forming member 21. The liquid discharge port 15 is formed by photolithography or dry etching employing exposure and developing.

Figure 1H:
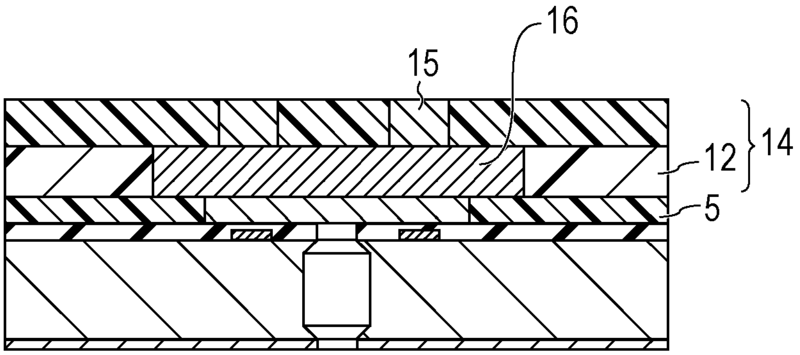

Finally, as illustrated in FIG. 1H, a channel 16 is formed by performing developing of the resin layer. The liquid discharge port 15 may also be formed by this devilment at the same time as the channel 16.

The liquid discharging head according to an embodiment of the present invention is manufactured by a method such as described above.

Embodiments

Hereinafter, embodiments of the present application will be described.

First Embodiment

First, as illustrated in FIG. 1A, a substrate 1 formed of silicon was prepared. Multiple energy-generating elements 2 made of TaSiN were formed on a first face side of the substrate 1, and a sacrificial layer 7 made of aluminum was formed between the energy-generating elements 2. The energy-generating elements 2 were connected to a semiconductor element configured to drive energy-generating elements by wiring (not illustrated) or the like, and the energy-generating elements 2 and sacrificial layers 7 were covered with an insulation layer 3 made of SiN. A protective layer 4 made of $SiO_2$ was provided to a second face side of the substrate 1.

Next, as illustrated in FIG. 1B, a resin layer 19 made of a resin was formed on the first face side of the substrate 1. Liquid resist TMMR (trade name, manufactured by Tokyo Ohka Kogyo Co. Ltd.) including 157S70 (trade name, Mitsubishi Chemical Corporation), which is a negative photosensitive resin, SP-172 (trade name, ADEKA CORPORATION) which is a photocationic polymerization initiator, and PGMEA (trade name, manufactured by Tokyo Ohka Kogyo Co. Ltd.) were coated on the substrate by spin coating, as the resin layer 19. Next, a part of the resin layer 19 was masked, and exposure was performed with an i line (wavelength of 365 nm) using FPA-3000i5$^+$ (manufactured by CANON KABUSHIKI KAISHA). A portion exposed of the resin layer 19 was taken as a side wall 5, and an unexposed portion was taken as a channel portion 6.

Next, as illustrated in FIG. 1C, a laser beam was irradiated on the substrate 1 from the second face side, and the sacrificial layer 7 and resin layer 19 were penetrated by the laser beam. Third harmonic generation waves (355 μm) of a YAG laser were employed as the laser beam, and the spot diameter was adjusted to 30 μm. A processing pattern of the laser beam was disposed so that points were linearly arrayed so as to be included (overlapped) in a range of the sacrificial layer 7 on the first face side as viewed from the second face side. The stage illustrated in FIG. 3A was employed as a stage at the time of laser irradiation. A reflex inhibition region 17 was formed of silicon of which laser reflectivity is 50% or less.

Next, as illustrated in FIG. 1D, developing of the resin layer 19 was performed, and a portion including the region of the resin layer 19 penetrated by the laser beam was removed. PGMEA (trade name, manufactured by Tokyo Ohka Kogyo Co. Ltd.) was employed as a developing solution at the time of developing. Thus, the channel portion 6 which is the portion penetrated by the laser beam was removed, and at the same time, debris 9 was also removed. Simultaneously, according to removal of the channel portion 6, the side wall 5 of the resin layer 19 served as a portion of a channel forming member internally forming a channel.

Next, as illustrated in FIG. 1E, etchant was supplied to a hole formed by the laser beam, and the substrate 1 was subjected to etching, thereby forming a liquid supply port 11. The substrate 1 was subjected to anisotropic etching using a TMAH (tetramethylammonium hydroxide) solution with 22 percent by mass at 83 degrees Centigrade as the etchant. The first face side of the substrate 1 was covered with OBC (cyclized rubber, manufactured by Tokyo Ohka Kogyo Co. Ltd.) which is an etching protective member while the substrate 1 was subjected to etching, and this protective member was removed after etching. Thus, the liquid supply port 11 was formed in the substrate 1. Also, the sacrificial layer 7 and debris 10 on the second face side were removed by etching.

Next, as illustrated in FIG. 1F, a second resin layer 20 was formed on the side wall 5 of the resin layer 19. A dry film including 100 parts by mass of EHPE3150 (trade name, manufactured by Daicel Chemical Industries, Ltd.) which is a negative photosensitive resin, and 6 parts by mass of SP-172 (trade name, manufactured by ADEKA CORPORATION) which is a photocationic polymerization initiator was employed as the second resin layer 20.

Next, a portion of the second resin layer 20 was masked, and exposure was performed using FPA-3000i5$^+$ (manufactured by CANON KABUSHIKI KAISHA). A portion exposed of the second resin layer 20 was taken as a side wall 12, and an unexposed portion was taken as a channel portion 13.

Next, as illustrated in FIG. 1G, a discharge port forming member 21 was formed on the side wall 12. A dry film including 100 parts by mass of EHPE3150 (trade name, manufactured by Daicel Chemical Industries, Ltd.) which is a negative photosensitive resin, and 6 parts by mass of SP-172 (trade name, manufactured by ADEKA CORPORATION) which is a photocationic polymerization initiator was employed as the discharge port forming member 21.

Next, the discharge port forming member 21 was partially exposed using a stepper.

Finally, as illustrated in FIG. 1H, the channel portion 13 and the unexposed region of the discharge port forming member 21 were developed using PGMEA, thereby forming a channel 16 and a liquid discharge port 15.

Second Embodiment

With the first embodiment, the stage illustrated in FIG. 3A was employed, but on the other hand, with the second embodiment, a stage illustrated in FIG. 3B was employed. Otherwise, the second embodiment was carried out in the same way as with the first embodiment.

The stage employed in the second embodiment included a hollow portion 18 with depth of 100 μm, and width of 400 μm.

With the second embodiment, reflection of the laser beam from the stage was able to be suppressed even further.

According to the present invention, debris can be suppressed from adhering to the substrate or channel forming member with a simple process, even in the event of forming a liquid supply port by laser irradiation on the substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-263260, filed Nov. 30, 2012, which is hereby incorporated by reference herein in its entirety.

What is claimed is:

1. A manufacturing method of a liquid discharging head including a substrate, in which a liquid supply port is formed, having an energy-generating element on a first face side, and a channel forming member configured to form a channel and a discharge port, the method comprising:

preparing the substrate having the energy-generating element and a resin layer on the first face side;

irradiating a laser beam on the substrate so as to pass through the resin layer to form a hole serving as the liquid supply port in the substrate;

removing a portion of the resin layer including a region which the laser beam has penetrated, thereby forming a portion from which the resin layer has been removed as a channel, and forming a portion in which the resin layer remains as a side wall; and forming a discharge port forming member, after the removing the portion of the resin layer, on a far side from the substrate of the side wall, and to form the channel forming member using the side wall and the discharge port forming member.

2. The liquid discharging head manufacturing method according to claim 1, wherein the laser beam is irradiated from a second face side which is a rear face side of the first face side to the substrate.

3. The liquid discharging head manufacturing method according to claim 1, wherein the resin layer is formed of a negative photosensitive resin.

4. The liquid discharging head manufacturing method according to claim 1, wherein the hole is formed, following which etchant is supplied to this hole.

5. The liquid discharging head manufacturing method according to claim 1, wherein a sacrificial layer, which is readily subjected to etching as compared to a substrate, is formed on the first face side of the substrate, on which the laser beam is irradiated, thereby penetrating the sacrificial layer using this laser beam.

6. The liquid discharging head manufacturing method according to claim 1, wherein the resin layer is formed of a negative photosensitive resin, a portion of the resin layer is exposed, thereby forming an exposed region of the resin layer as the side wall, and a region not exposed of the resin layer is removed, and is formed as the channel.

7. The liquid discharging head manufacturing method according to claim 6, wherein the exposure is performed before a laser beam is irradiated on the substrate.

8. The liquid discharging head manufacturing method according to claim 6, wherein the exposure is performed after a laser beam is irradiated on the substrate.

9. The liquid discharging head manufacturing method according to claim 1, wherein the substrate is, at the time of irradiating a laser beam on the substrate, held at a stage having a reflex inhibition region where laser reflectivity is 50% or less, and the laser beam reaches the reflex inhibition region.

10. The liquid discharging head manufacturing method according to claim 1, wherein the substrate is, at the time of irradiating a laser beam on the substrate, held at a stage where a hollow portion is formed, and the laser beam reaches the hollow portion.

* * * * *